UNITED STATES PATENT OFFICE.

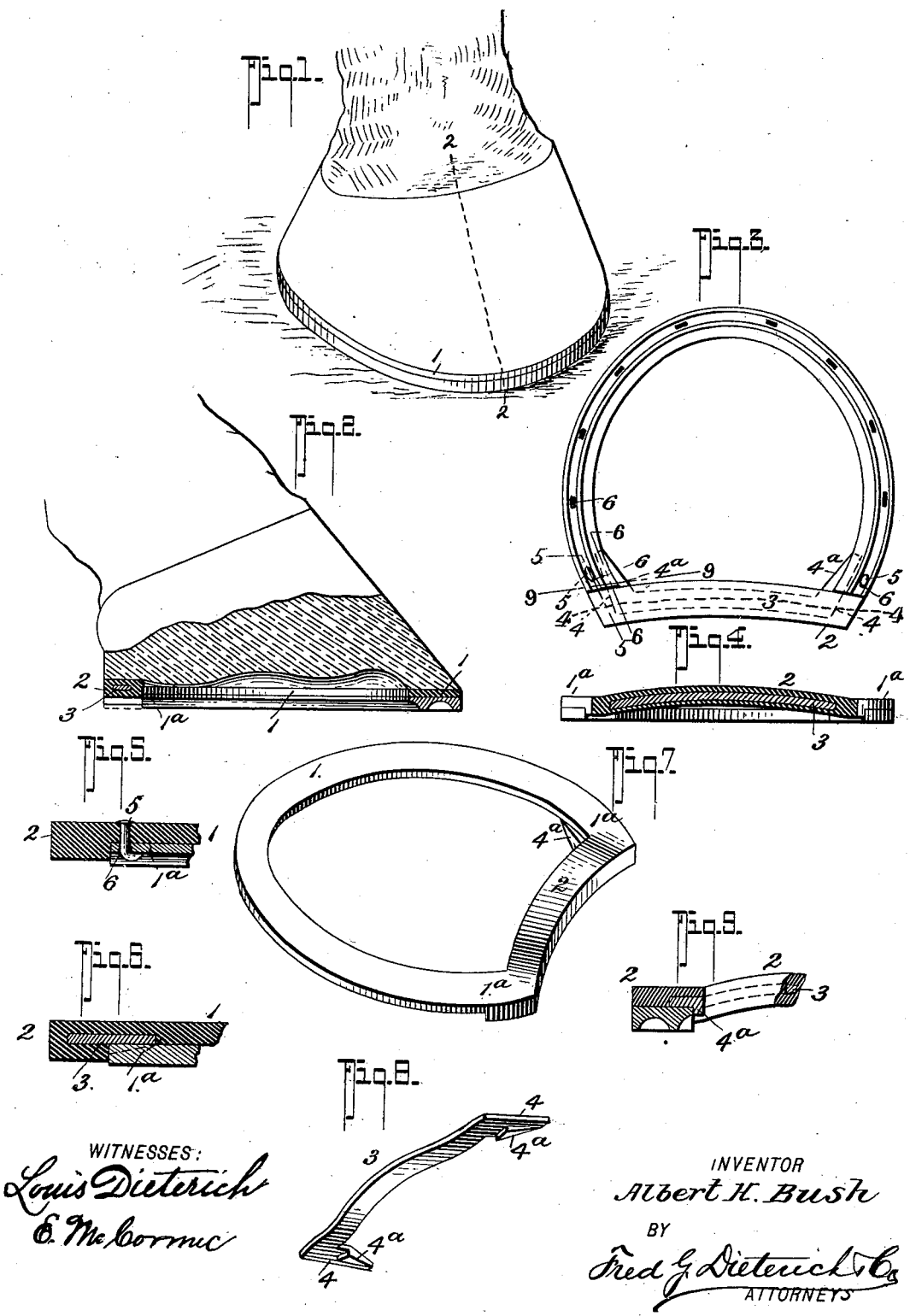

ALBERT H. BUSH, OF LOUISVILLE, KENTUCKY.

HORSESHOE-PAD.

SPECIFICATION forming part of Letters Patent No. 648,236, dated April 24, 1900.

Application filed February 6, 1900. Serial No. 4,246. (No model.)

*To all whom it may concern:*

Be it known that I, ALBERT H. BUSH, residing at Louisville, in the county of Jefferson and State of Kentucky, have invented a new and Improved Foot-Pad for Horses, of which the following is a specification.

This invention is in the nature of an improved foot-pad for horses. It is more particularly adapted for use on race-horses; and it primarily seeks to provide a very simple and inexpensive pad that can be readily fitted upon the ordinary racing-shoe without requiring any special means for holding it secure in position.

Again, my invention has for its purpose to provide a rubber foot-pad of such construction that when applied it will produce a cushion-surface that will not alone serve to protect tender feet, but also provide a sufficient resiliency to overcome the shock upon the foot during running, as well as insuring a comfortable and secure tread-surface for the foot.

My invention consists in a pad having the novel construction hereinafter first described in detail and then specifically set out in the appended claims, reference being had to the accompanying drawings, in which—

Figure 1 is a view illustrating my invention as applied to a horse's hoof. Fig. 2 is a longitudinal section taken substantially on the line 2 2 of Fig. 1. Fig. 3 is an inverted plan view of the racing-shoe with the pad applied thereto. Fig. 4 is a transverse section taken on the line 4 4 of Fig. 3. Fig. 5 is a detail section on the line 5 5 of Fig. 3. Fig. 6 is a similar view on the line 6 6 of Fig. 3. Fig. 7 is a view of the hoof-pad. Fig. 8 is a detail view of the metallic reinforce or bridge piece, and Fig. 9 is a detail longitudinal section taken on the line 9 9 of Fig. 3.

My improved pad in its generic nature consists in a pad made of rubber or other suitable cushion material, having sufficient rigidity to maintain its shape; and the said pad comprises a front or main portion 1, having a horseshoe shape, and a transverse portion 2, that joins the ends 1$^a$ of the main portion.

In practice the pad is made of suitable thickness of like degree throughout, excepting the rear or transverse portion 2, which preferably is of an increased thickness, and the said portion in practice is arranged to engage the rear of the frog part of the hoof, whereby to provide a cushion-bearing for such part of the hoof.

By making the pad of an endless member, as described, the transverse portion 2 will also serve to maintain the shape of the shoe portion and keep the ends 1$^a$ from spreading.

So far as described it will be readily apparent that my form of pad can be fitted upon the hoof between it and the shoe and securely held in place by the nails that secure the shoe to the hoof, the same forming a simple, compact, and effective pad, being of a minimum weight and not adapted to interfere with the proper running, the transverse portion 2 forming, as it were, a tread and means for protecting the hoof against danger from comtact with stone, gravel, or other hard substances, and to augment such protecting qualities the transverse portion may have its upper surface slightly elevated above the shoe, as clearly illustrated in Fig. 4.

To give the transverse portion of the pad more stiffness, so that it will always lie snugly up against the hoof and provide a positive cushion-bearing therefor, the said portion 2 of the pad is reinforced by a steel rod or plate 3, which is curved slightly upward throughout its length and has its ends terminate in flat angle extensions 4, which when the pad is fitted in place rest upon the upper face of the ends of the shoe and form rigid supporting-bearings for properly holding the rod or plate, together with the rubber portion 2, which entirely surrounds the said plate 3, and impart the required rigidity to the transverse portion 2 of the pad, it being understood that the pressure of the hoof against the pad portions over the ends 1$^a$ when the shoe and pad are fitted and the pad held by the horseshoe-nails alone will securely clamp the said ends 4 in place.

For some uses the pad may be constructed without the rod or bar 3 in its transverse portion 2, and the said portion 2 may be of sufficient thickness so that its lower face will project in the plane with the under or bearing face of the shoe, as indicated in dotted lines in Fig. 2; but when my pad is intended for use in connection with racing-shoes such manner of forming the member 2 does not effect all the results desired, as the omission of the rod or plate renders the transverse part of the pad too pliable and soft.

The pad proper requires no special means for keeping it in place and can be readily fitted upon the hoof or top of the shoe during the operation of nailing the shoe to the hoof. When, however, the pad is to be sold with the shoe, said pad is preferably secured to the shoe at its ends 1ª by means of rivets 5, passed down through the pad and through the first nail-holes 6 in the ends of the shoe by setting the lower ends of the rivet as shown in Fig. 5. This keeps the pad secure upon the shoe and forms a permanent means for properly clamping the ends of the reinforcing-rod down upon the shoe ends.

My invention is of a very simple and economical character, and while it is more especially intended for use in connection with racing-shoes it can be used with the ordinary forms of horses' shoes.

As an additional means for holding the pads in proper position on the shoe and to prevent the same from slipping sidewise, the angle portions 4 of the stiffener or bridge-piece 3 are made with a pendent flange or rib 4ª, which projects down on the inside of the inner or heel portions of the shoe to form stops to prevent lateral movement of the pad on the shoe, said ribs being preferably tapered sidewise and on the bottom, as shown in the drawings.

Having thus described my invention, what I claim, and desire to secure by Letters Patent, is—

1. The combination with the horseshoe; of a cushion-body comprising a pad portion shaped like the shoe, and a transverse or heel portion formed integrally with the pad portion, said transverse portion having a greater rigidity than the remaining part of the pad and held in a plane above the tread-face of the shoe.

2. The combination with the calkless shoe; of a hoof-pad formed of a cushion-body comprising a portion having the shape of the horseshoe, and a transverse or heel member, said transverse member being held in a plane above the tread-surface of the shoe, and having a greater rigidity than the remaining portion of the pad, the said transverse member being also bent upward in a plane above the shoe portion of the pad.

3. The combination with the calkless or racing shoe, of the hoof-pad formed of rubber and comprising a body portion having a horseshoe shape and having a transverse or heel member integrally formed with the body portion, and a metallic stiffener embedded within the said heel member, said stiffener and heel portion being bent up in a plane above the shoe part of the pad, all being arranged substantially as shown and for the purposes described.

4. A horseshoe-pad formed of rubber, comprising a body portion having a horseshoe shape; an integral transverse member joining the ends of the horseshoe portion, and a metallic stiffener-plate embedded in the transverse member, the ends of which terminate in angle extensions adapted to be projected under the ends of the horseshoe portion, as specified.

5. A horseshoe-pad, formed of rubber, comprising a body portion having a horseshoe shape; an integral transverse member joining the ends of the horseshoe portion; a metallic stiffener or rod embedded in the transverse member, said rod being bent up in a plane above the body portion of the pad and having its ends terminating in angle extensions adapted to be projected under the ends of the horseshoe portion, as specified.

6. The combination with the shoe, of a pad formed of rubber, said pad having a body portion of horseshoe shape and a transverse portion joining the ends of the body portion; a metallic rod or plate in the transverse portion, said rod having its ends terminating in angle extensions fitting over the top of the ends of the shoe; and rivets securing the pad to the shoe at the outer ends thereof, substantially as shown and described.

7. A hoof-pad formed of a cushion-body comprising a portion having a horseshoe shape, and a transverse member formed integrally therewith, a metallic plate embedded within the transverse member, the said plate having angled extensions adapted to project under the ends of the horseshoe portion of the pad, and having pendent lugs 4ª, substantially as shown and for the purposes described.

ALBERT H. BUSH.

Witnesses:
JOHN D. COLVIN,
JNO. O. WHITLOW.